(12) United States Patent
Takeno et al.

(10) Patent No.: US 11,578,629 B2
(45) Date of Patent: Feb. 14, 2023

(54) POROUS COMPOSITE

(71) Applicant: NGK INSULATORS, LTD., Nagoya (JP)

(72) Inventors: Shogo Takeno, Nagoya (JP); Kousuke Ujihara, Nagoya (JP); Kenji Morimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/135,070

(22) Filed: Dec. 28, 2020

(65) Prior Publication Data

US 2021/0123365 A1   Apr. 29, 2021

Related U.S. Application Data

(63) Continuation of application No. PCT/JP2018/029028, filed on Aug. 2, 2018.

(51) Int. Cl.
| | |
|---|---|
| *F01N 3/022* | (2006.01) |
| *B01D 39/20* | (2006.01) |
| *B01D 46/24* | (2006.01) |
| *B01J 23/10* | (2006.01) |
| *B01J 35/04* | (2006.01) |
| *B01D 46/82* | (2022.01) |
| *F01N 3/023* | (2006.01) |

(52) U.S. Cl.
CPC ....... *F01N 3/0222* (2013.01); *B01D 39/2068* (2013.01); *B01D 46/2429* (2013.01); *B01D 46/2474* (2013.01); *B01D 46/2482* (2021.08); *B01D 46/24492* (2021.08); *B01D 46/82* (2022.01); *B01J 23/10* (2013.01); *B01J 35/04* (2013.01); *B01D 2239/1216* (2013.01); *B01D 2239/1291* (2013.01); *B01D 2279/30* (2013.01); *F01N 3/023* (2013.01); *F01N 2330/02* (2013.01)

(58) Field of Classification Search
None
See application file for complete search history.

(56) References Cited

U.S. PATENT DOCUMENTS

| | | | |
|---|---|---|---|
| 2004/0037754 A1 | 2/2004 | van Setten et al. | |
| 2007/0025901 A1* | 2/2007 | Nakatsuji | B01J 29/7415 423/239.2 |
| 2009/0173065 A1* | 7/2009 | Cho | B01J 23/63 60/299 |
| 2011/0071019 A1* | 3/2011 | Hanaki | B01J 37/0205 502/304 |
| 2012/0017554 A1 | 1/2012 | Iwasaki et al. | |
| 2012/0309614 A1* | 12/2012 | Ohtake | B01J 37/031 502/263 |
| 2014/0364305 A1* | 12/2014 | Yamada | B01J 23/10 502/302 |

(Continued)

FOREIGN PATENT DOCUMENTS

| | | |
|---|---|---|
| EP | 2 168 662 A1 | 3/2010 |
| JP | 2004-084666 A1 | 3/2004 |

(Continued)

OTHER PUBLICATIONS

International Search Report and Written Opinion (Application No. PCT/JP2018/029028) dated Nov. 6, 2018.

(Continued)

*Primary Examiner* — Elizabeth Collister
(74) *Attorney, Agent, or Firm* — Burr Patent Law, PLLC

(57) ABSTRACT

A porous composite includes a porous base material, and a porous collection layer. The collection layer is provided on the base material. The collection layer contains praseodymium oxide.

10 Claims, 9 Drawing Sheets

(56) References Cited

U.S. PATENT DOCUMENTS

| | | | |
|---|---|---|---|
| 2015/0111727 A1* | 4/2015 | Nagashima | B01D 53/945 |
| | | | 502/303 |
| 2015/0260067 A1 | 9/2015 | Kikuchi et al. | |
| 2016/0115835 A1* | 4/2016 | Daido | B01D 53/944 |
| | | | 422/180 |
| 2016/0296873 A1 | 10/2016 | Onoe et al. | |
| 2016/0298512 A1 | 10/2016 | Onoe et al. | |
| 2017/0001172 A1* | 1/2017 | Zhao | B01J 23/63 |
| 2019/0193067 A1 | 6/2019 | Yamada et al. | |

FOREIGN PATENT DOCUMENTS

| | | | |
|---|---|---|---|
| JP | 2010-094628 A1 | 4/2010 | |
| JP | 2011-208526 A1 | 10/2011 | |
| JP | 5634984 B2 | 12/2014 | |
| JP | 2015-174038 A1 | 10/2015 | |
| WO | WO-2012156883 A1 * | 11/2012 | B01J 35/0006 |
| WO | 2015/083670 A1 | 6/2015 | |
| WO | 2015/083671 A1 | 6/2015 | |
| WO | 2018/037637 A1 | 3/2018 | |

OTHER PUBLICATIONS

English translation of the International Preliminary Report on Patentability (Chapter I) (Application No. PCT/JP2018/029028) dated Feb. 11, 2021.

German Office Action (with English translation), Gennan Application No. 11 201 8 007 883.3, dated Nov. 30, 2021 (12 pages).

* cited by examiner

POROUS COMPOSITE

CROSS-REFERENCE TO RELATED APPLICATION

The present application is a continuation application of International Application No. PCT/JP2018/29028 filed on Aug. 2, 2018. The content of this application is incorporated herein by reference in its entirety.

TECHNICAL FIELD

The present invention relates to a porous composite.

BACKGROUND ART

Gases emitted from internal combustion engines such as diesel engines or various combustion apparatuses contain particulate matter such as soot. Hence, vehicles or other equipment that mount diesel engines are provided with filters for collecting particulate matter in exhaust gases. As one of these filters, a honeycomb structure is used in which some of a plurality of cells in a porous honeycomb base material have sealing parts at openings located on their outlet side, and the remaining cells have sealing parts at openings located on their inlet side.

In the case of using such a honeycomb structure to collect particulate matter, if the particulate matter infiltrates into the inside of a partition wall of the porous honeycomb base material, pores of the partition wall may be blocked off and pressure loss may increase. In view of this, Japanese Patent No. 5634984 (Document 1) has proposed to provide a porous collection layer on the inner surfaces of cells that each have a sealing part at an opening located on the outlet side, to collect particulate matter by this collection layer in order to suppress infiltration of the particulate matter into the inside of the partition wall. The collection layer preferably contains 70% by weight or more of ceramic or metallic inorganic fibers. The inorganic fibers contain one or more materials selected from aluminosilicate, alumina, silica, zirconia, ceria and mullite.

In the above filter mounted on a vehicle or the like, in order to prevent excessive accumulation of particulate matter on the filter, a regeneration process is performed in which the particulate matter collected by the filter is heated, oxidized, and removed from the filter. In the honeycomb filter of Document 1, by supporting the catalytic function in the collection layer, the oxidation of the particulate matter in contact with the collection layer is accelerated.

Currently, in the honeycomb structure used as the above filter, further acceleration of oxidation of particulate matter is required.

SUMMARY OF INVENTION

The present invention is intended for a porous composite, and it is an object of the present invention to accelerate oxidation of particulate matter.

The porous composite according to a preferred embodiment of the present invention includes a porous base material, and a porous collection layer provided on the base material. The collection layer contains praseodymium oxide. This porous composite can accelerate oxidation of particulate matter.

Preferably, the collection layer contains cerium oxide.

Preferably, a percentage of praseodymium element contained in the collection layer is greater than or equal to 5% by weight and less than or equal to 75% by weight.

Preferably, with respect to a depth direction perpendicular to an interface between the collection layer and the base material, a reaction layer of the base material and praseodymium oxide has a thickness less than or equal to 3 μm from the interface.

Preferably, the collection layer has a thickness greater than or equal to 6 μm. The collection layer has a plurality of large pores, each exposing a surface of the base material. A sum of areas of exposed regions of the base material that are each exposed through each large pore of the plurality of large pores is greater than or equal to 1% of a total area of the collection layer and less than or equal to 50% of the total area of the collection layer.

Preferably, the exposed regions of the base material each exposed through each large pore have perimeters greater than or equal to 18 μm and less than or equal to 500 μm.

Preferably, the collection layer has pores with diameters greater than or equal to 3 μm and less than or equal to 20 μm in a region other than the plurality of large pores.

Preferably, the collection layer has a thickness greater than or equal to 6 μm. In a photograph of sections of the collection layer and the base material captured at 500 times magnification by an SEM, a plurality of straight lines perpendicular to an interface between the collection layer and the base material are arranged at an equal interval along the interface, and a value obtained by dividing the number of a plurality of overlapping straight lines that overlap with pixels indicating the collection layer by a total number of the plurality of straight lines is greater than or equal to 50% and less than or equal to 90%.

Preferably, a value obtained by dividing the number of overlapping straight lines that overlap with pixels indicating the collection layer by an amount less than 10% of a thickness of the collection layer, among the plurality of overlapping straight lines, by the total number of the plurality of straight lines is greater than or equal to 30%.

Preferably, the base material has a honeycomb structure whose inside is partitioned into a plurality of cells by a partition wall. At least some of the plurality of cells have inner surfaces covered with the collection layer.

Preferably, the porous composite is a gasoline particulate filter that collects particulate matter in an exhaust gas emitted from a gasoline engine.

These and other objects, features, aspects and advantages of the present invention will become more apparent from the following detailed description of the present invention when taken in conjunction with the accompanying drawings.

DESCRIPTION OF EMBODIMENTS

Figure 1:
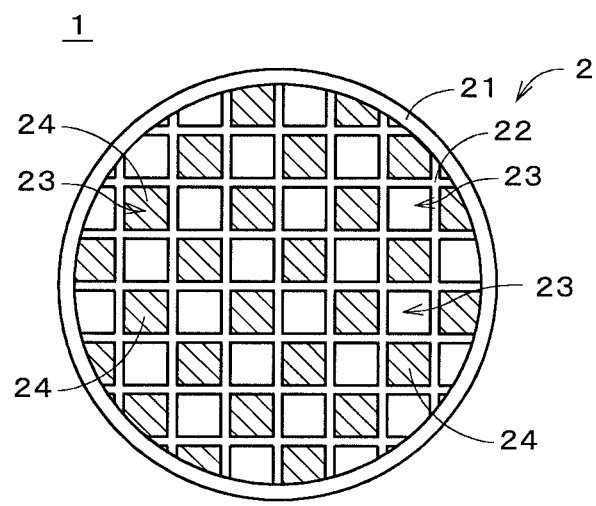
FIG. 1 is a plan view of a porous composite according to one embodiment.
Figure 2:
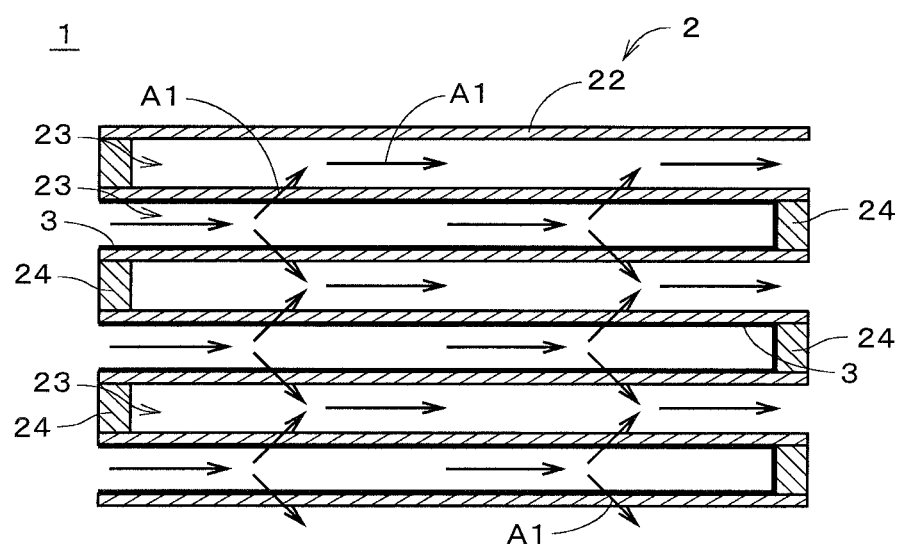
FIG. 2 is a sectional view of the porous composite.

FIG. 1 is a simplified plan view of a porous composite 1 according to one embodiment of the present invention. The porous composite 1 is a tubular member that is long in one direction. In FIG. 1, the end face on one side in the longitudinal direction of the porous composite 1 is illustrated. FIG. 2 is a sectional view of the porous composite 1. In FIG. 2, part of a section taken along the longitudinal direction is illustrated. For example, the porous composite 1 is used as a gasoline particulate filter (GPF) for collecting particulate matter such as soot in an exhaust gas emitted from a gasoline engine of a vehicle such as an automobile.

The porous composite 1 includes a porous base material 2 and a porous collection layer 3. In the example illustrated in FIGS. 1 and 2, the base material 2 is a member having a honeycomb structure. The base material 2 includes a tubular outer wall 21 and a partition wall 22. The tubular outer wall 21 is a tubular portion that extends in the longitudinal direction (i.e., the left-right direction in FIG. 2). The tubular outer wall 21 has, for example, a generally circular sectional shape perpendicular to the longitudinal direction. This sectional shape may be any other shape such as a polygonal shape.

The partition wall 22 is a grid-shaped portion that is provided inside the tubular outer wall 21 and partitions the inside into a plurality of cells 23. Each of the cells 23 is a space extending in the longitudinal direction. Each cell 31 has, for example, a generally square sectional shape perpendicular to the longitudinal direction. This sectional shape may be any other shape such as a polygonal shape or a circular shape. These cells 23 have the same sectional shape as a general rule. Alternatively, these cells 23 may include cells 23 that have different sectional shapes. The base material 2 is a cell structure whose inside is partitioned into the cells 23 by the partition wall 22.

The tubular outer wall 21 and the partition wall 22 are both porous portions. The tubular outer wall 21 and the partition wall 22 are formed of, for example, ceramic such as cordierite. The material of the tubular outer wall 21 and the partition wall 22 may be ceramic other than cordierite, or may be a material other than ceramic. The tubular outer wall 21 has a length of, for example, 50 mm to 300 mm in the longitudinal direction. The outside diameter of the tubular outer wall 21 is, for example, in the range of 50 mm to 300 mm. The thickness of the tubular outer wall 21 is, for example, greater than or equal to 30 micrometers ($\mu$m) and preferably greater than or equal to 50 $\mu$m. The thickness of the tubular outer wall 21 is also, for example, less than or equal to 1000 $\mu$m, preferably less than or equal to 500 $\mu$m, and more preferably less than or equal to 350 $\mu$m.

The length of the partition wall 22 in the longitudinal direction is generally the same as that of the tubular outer wall 21. The thickness of the partition wall 22 is, for example, greater than or equal to 30 $\mu$m and preferably greater than or equal to 50 $\mu$m. The thickness of the partition wall 22 is also, for example, less than or equal to 1000 $\mu$m, preferably less than or equal to 500 $\mu$m, and more preferably less than or equal to 350 $\mu$m. The porosity of the partition wall 22 is, for example, higher than or equal to 20% and preferably higher than or equal to 30%. The porosity of the partition wall 22 is also, for example, lower than or equal to 80% and preferably lower than or equal to 70%. A mean pore diameter of the partition wall 22 is, for example, greater than or equal to 5 $\mu$m and preferably greater than or equal to 8 $\mu$m. The mean pore diameter of the partition wall 22 is also, for example, less than or equal to 30 $\mu$m and preferably less than or equal to 25 $\mu$m.

A cell density of the base material 2 (i.e., the number of cells 23 per unit area of a section perpendicular to the longitudinal direction) is, for example, greater than or equal to 10 cells/cm' (per square centimeter), preferably greater than or equal to 20 cells/cm", and more preferably greater than or equal to 30 cells/cm'. The cell density is also, for example, less than or equal to 200 cells/cm' and preferably less than or equal to 150 cells/cm". In the illustration in FIG. 1, the sizes of the cells 23 are greater than the actual sizes, and the number of cells 23 is smaller than the actual number. The sizes and number of the cells 23 may be changed in various ways.

In the case where the porous composite 1 is used as a GPF, a gas such as an exhaust gas flows through the inside of the porous composite 1, with one end side of the porous composite 1 in the longitudinal direction (i.e., the left side in FIG. 2) as an inlet and the other end side as an outlet. Some of the cells 23 of the porous composite 1 each have a sealing part 24 at the end on the inlet side, and the remaining cells 23 each have a sealing part 24 at the end on the outlet side.

FIG. 1 is an illustration of the inlet side of the porous composite 1. In FIG. 1, the sealing parts 24 on the inlet side are cross-hatched in order to facilitate understanding of the drawing. In the example illustrated in FIG. 1, the cells 23 that have the sealing parts 24 on the inlet side and the cells 23 that do not have the sealing parts 24 on the inlet side (i.e., the cells 23 that have the sealing parts 24 on the outlet side) are arranged alternatively in both the vertical and horizontal directions in FIG. 1.

The collection layer 3 is formed in film form on the surface of the base material 2. In the example illustrated in FIG. 2, the collection layer 3 is provided in the cells 23 that have the sealing parts 24 on the outlet side, and covers the inner surfaces of these cells 23 (i.e., the surface of the partition wall 22). In FIG. 2, the collection layer 3 is indicated by bold lines. The collection layer 3 also covers the inner surfaces of the sealing parts 24 on the outlet side in the cells 23. On the other hand, the collection layer 3 does not exist in a plurality of cells 23 that have the sealing parts 24 on the inlet side.

The collection layer 3 contains praseodymium oxide. Praseodymium oxide contained in the collection layer 3 is any one, or two or more of $Pr_6O_{11}$, $PrO_2$ and $Pr_2O_3$. The percentage of praseodymium element (Pr) contained in the collection layer 3 is preferably greater than or equal to 5% by weight, more preferably greater than or equal to 8% by weight, and further preferably greater than or equal to 10% by weight. The percentage of praseodymium element contained in the collection layer 3 is also preferably less than or equal to 75% by weight, more preferably less than or equal to 70% by weight, and further preferably less than or equal to 50% by weight. The collection layer 3 may contain a substance other than praseodymium oxide.

The collection layer 3 preferably contains cerium oxide ($CeO_2$) in addition to praseodymium oxide. The percentage of $CeO_2$ contained in the collection layer 3 is preferably greater than or equal to 5% by weight, more preferably greater than or equal to 8% by weight, and further preferably greater than or equal to 10% by weight. The percentage of $CeO_2$ contained in the collection layer 3 is also preferably less than or equal to 75% by weight, more preferably less than or equal to 70% by weight, and further preferably less than or equal to 50% by weight. The collection layer 3 may contain a substance other than praseodymium oxide and $CeO_2$.

The porosity of the collection layer 3 is, for example, higher than or equal to 60% and preferably higher than or equal to 70%. The porosity of the collection layer 3 is also, for example, lower than or equal to 95% and preferably lower than or equal to 90%. The thickness of the collection layer 3 is, for example, greater than or equal to 6 μm, preferably greater than or equal to 8 μm, and more preferably greater than or equal to 10 μm. The thickness of the collection layer 3 is also, for example, less than or equal to 100 μm, preferably less than or equal to 70 nm, and more preferably less than or equal to 50 μm.

Figure 3:
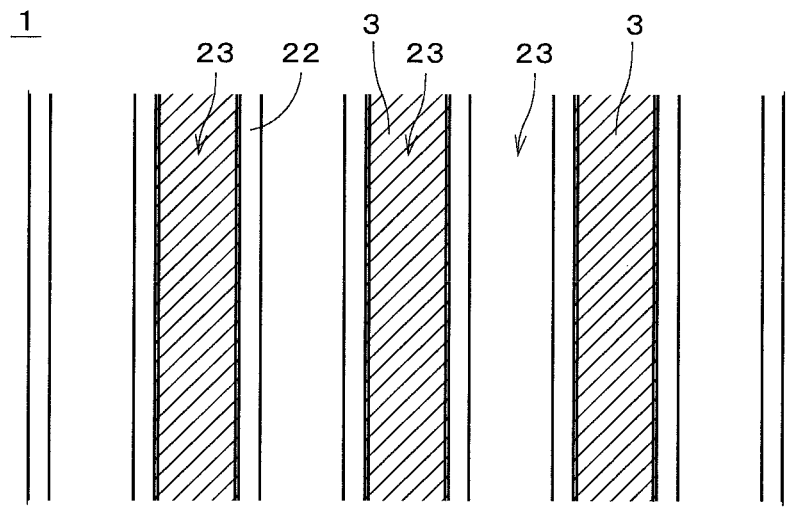
FIG. 3 is a diagram of part of the porous composite that has been cut.

The thickness of the collection layer 3 can be measured by a 3D-shape measuring device. Specifically, the porous composite 1 is first cut at a section parallel to the longitudinal direction and including a plurality of cells 23, and an image of this section is captured by a 3D-shape measuring device (one-shot 3D measuring macroscope VR-3200 manufactured by Keyence Corporation). FIG. 3 is a schematic diagram of the image obtained by the 3D-shape measuring device. This image includes seven cells 23 that are symmetrical with respect to a point and symmetrical with respect to a vertical line. Among these seven cells 23, the cell 23 in the center and cells 23 that are each the second cell from the cell 23 in the center in the left-right direction are provided with the collection layer 3. In FIG. 3, the collection layer 3 is cross-hatched in order to facilitate understanding of the drawing. In FIG. 3, sections of the collection layer 3 on the partition wall 22 are indicated by thick lines.

Then, five cells 23 among the seven cells 23, excluding the cells 23 at the left and right ends, are subjected to measurement using the aforementioned 3D-shape measuring device so as to obtain an average height in a central portion of each cell 23 in the left-right direction. This central portion measured by the 3D-shape measuring device has a width in the left-right direction that is approximately one third of the width of the cell 23 in the left-right direction. In the 3D-shape measuring device, the orientation of the cell 23, the measuring method, and the like may be appropriately changed so that the cell 23 can be easily measured. For example, when the light used for shape measurement in the 3D-shape measuring device is irradiated to the cell 23 from diagonally above in the left-right direction, or when the partition wall 22 on both the left and right sides of the cell 23 obstructs the irradiation of the light, the light may be irradiated substantially parallel to the longitudinal direction of the cell 23. The five cells 23 include three cells 23 provided with the collection layer 3 and two cells 23 that are not provided with the collection layer 3. Then, the thickness of the collection layer 3 is obtained by subtracting an average value of the average heights of the two cells 23 that are not provided with the collection layer 3 from an average value of the average heights of the three cells 23 provided with the collection layer 3.

The thickness of the collection layer 3 is, for example, measured in the central portions of the cells 23 in the longitudinal direction. Alternatively, the thickness of the collection layer 3 may be an average value of thicknesses measured in the central, upper, and lower portions of the cells 23 in the longitudinal direction.

As indicated by arrows A1 in FIG. 2, the gas flowing into the porous composite 1 flows into cells 23 whose inlet sides are not sealed from the inlets of these cells 23, and flows from these cells 23 through the collection layer 3 and the partition wall 22 into cells 23 whose outlet sides are not sealed. At this time, particulate matter in the gas is efficiently collected by the collection layer 3.

Next, one example of the method of producing the porous composite 1 will be described with reference to FIG. 4. In the case of producing the porous composite 1, first the outer surface of the tubular outer wall 21 of the base material 2 is covered with a liquid-impermeable sheet member. For example, a liquid-impermeable film is wrapped around generally the entire outer surface of the tubular outer wall 21.

Then, raw slurry for forming the collection layer 3 is prepared (step S11). The raw slurry is made by mixing, for example, particles as a raw material of the collection layer 3 (hereinafter, referred to as "collection layer particles"), particles of a pore-forming agent, and a flocculating agent with water. The collection layer particles are, for example, $Pr_6O_{11}$ particles. Alternatively, the collection layer particles may be $Pr_6O_{11}$ particles and $CeO_2$ particles. The raw slurry contains particles (hereinafter, referred to as "flocculated particles") formed by flocculating, for example, the collection layer particles and the particles of the pore-forming agent. In making the raw slurry, the type and amount of the flocculating agent to be added, for example, are determined such that the particle diameters of the flocculated particles become greater than the mean pore diameter of the base material 2. This prevents or suppresses the flocculated particles from infiltrating into the pores of the base material 2 in step S12 described later. The viscosity of the raw slurry is, for example, in the range of 2 mPa·s to 30 mPa·s.

Next, the raw slurry is supplied to a plurality of cells 23 on which the collection layer 3 is to be formed, among the cells 23 of the base material 2, from the inlets of these cells 23 (i.e., the ends that do not have the sealing parts 24) (step S12). The water in the raw slurry flows through the partition wall 22 of the base material 2 to adjacent cells 23 and flows out of the base material 2 from the ends of these adjacent cells 23 on the side where the sealing parts 24 are not provided. The flocculated particles in the raw slurry do not pass through the partition wall 22 and adhere to the inner surfaces of the cells 23 to which the raw slurry has been supplied. This forms an intermediate in which the flocculated particles adhere generally uniformly to the inner surfaces of the predetermined cells 23 of the base material 2.

When the supply of a predetermined amount of the raw slurry is completed, the intermediate from which water has run out is dried (step S13). For example, the intermediate is first dried at room temperature for 22 hours and then further dried by being heated at 80° C. for 24 hours. Thereafter, the intermediate is fired so that the collection layer particles in a large number of flocculated particles adhering to the base material 2 are bonded together and spread to the surface of the base material 2, forming the porous collection layer 3 (step S14). In this firing step, the particles of the pore-forming agent contained in the collection layer 3 are removed by combustion, so that small pores are formed in the collection layer 3.

Next, Examples 1 to 10 of the porous composite 1 according to the present invention and porous composites according to Comparative Examples 1 to 3 for use in comparison with the porous composite 1 will be described with reference to Tables 1 to 4. In the porous composites 1 of Examples 1 to 9, $Pr_6O_{11}$ and $CeO_2$ were used as the material for forming the collection layers 3. In the porous composite 1 of Example 10, $Pr_6O_{11}$ was used as the material for forming the collection layer 3. In the porous composites of Comparative Examples 1 to 3, $CeO_2$ was used as the material for forming the collection layer.

TABLE 1

|  |  | Example 1 | Example 2 | Example 3 |
|---|---|---|---|---|
| Collection Layer Material |  | $Pr_6O_{11}$ + $CeO_2$ | $Pr_6O_{11}$ + $CeO_2$ | $Pr_6O_{11}$ + $CeO_2$ |
| Product Name of $CeO_2$ |  | A | A | A |
| $Pr_6O_{11}$ Volume Percentage | % by volume | 75 | 50 | 25 |
| $Pr_6O_{11}$ Weight Percentage | % by weight | 71.7 | 45.8 | 22.0 |
| Pr Weight Percentage | % by weight | 72.0 | 46.2 | 22.2 |
| Reaction Layer Thickness | μm | 2 | 1 | 1 |
| Binding Force with Base Material |  | ○ | ◉ | ◉ |
| Combustion Starting Temperature | ° C. | 427 | 407 | 436 |

TABLE 2

|  |  | Example 4 | Example 5 | Example 6 |
|---|---|---|---|---|
| Collection Layer Material |  | $Pr_6O_{11}$ + $CeO_2$ | $Pr_6O_{11}$ + $CeO_2$ | $Pr_6O_{11}$ + $CeO_2$ |
| Product Name of $CeO_2$ |  | B | B | B |
| $Pr_6O_{11}$ Volume Percentage | % by volume | 75 | 50 | 25 |
| $Pr_6O_{11}$ Weight Percentage | % by weight | 71.7 | 45.8 | 22.0 |
| Pr Weight Percentage | % by weight | 72.0 | 46.2 | 22.2 |
| Reaction Layer Thickness | μm | 3 | 1 | 1 |
| Binding Force with Base Material |  | ○ | ◉ | ◉ |
| Combustion Starting Temperature | ° C. | 430 | 428 | 433 |

TABLE 3

|  |  | Example 7 | Example 8 | Example 9 |
|---|---|---|---|---|
| Collection Layer Material |  | $Pr_6O_{11}$ + $CeO_2$ | $Pr_6O_{11}$ + $CeO_2$ | $Pr_6O_{11}$ + $CeO_2$ |
| Product Name of $CeO_2$ |  | C | C | C |
| $Pr_6O_{11}$ Volume Percentage | % by volume | 75 | 50 | 25 |
| $Pr_6O_{11}$ Weight Percentage | % by weight | 71.7 | 45.8 | 22.0 |
| Pr Weight Percentage | % by weight | 72.0 | 46.2 | 22.2 |
| Reaction Layer Thickness | μm | 2 | 1 | 1 |
| Binding Force with Base Material |  | ○ | ◉ | ◉ |
| Combustion Starting Temperature | ° C. | 421 | 422 | 416 |

TABLE 4

|  |  | Example 10 | Comparative Example 1 | Comparative Example 2 | Comparative Example 3 |
|---|---|---|---|---|---|
| Collection Layer Material |  | $Pr_6O_{11}$ | $CeO_2$ | $CeO_2$ | $CeO_2$ |
| Product Name of $CeO_2$ |  | — | A | B | C |
| $Pr_6O_{11}$ Volume Percentage | % by volume | 100 | 0 | 0 | 0 |
| $Pr_6O_{11}$ Weight Percentage | % by weight | 100.0 | 0.0 | 0.0 | 0.0 |
| Pr Weight Percentage | % by weight | 100.0 | 0.0 | 0.0 | 0.0 |
| Reaction Layer Thickness | μm | 5 | 0 | 0 | 0 |
| Binding Force with Base Material |  | Δ | ◉ | ◉ | ◉ |
| Combustion Starting Temperature | ° C. | 421 | 451 | 449 | 459 |

In Examples 1 to 3 and Comparative Example 1, $CeO_2$ powder of product name A was used as the material. In Examples 4 to 6 and Comparative Example 2, $CeO_2$ powder of product name B which is a different type from the product name A was used as the material. In Examples 7 to 9 and Comparative Example 3, $CeO_2$ powder of product name C which is a different type from the product names A and B was used as the material. The characteristics of the $CeO_2$ powders of the product names A, B, and C, and the characteristics of the $Pr_6O_{11}$ powder are shown in Table 5.

TABLE 5

|  |  | $Pr_6O_{11}$ | CeO$_2$ Product Name: A | Product Name: B | Product Name: C |
|---|---|---|---|---|---|
| Average Particle Diameter | μm | 4.2 | 0.6 | 3.7 | 5.1 |
| Specific Surface Area (Room Temperature) | m²/g | 7.4 | 152.8 | 5.0 | 126.1 |
| Specific Surface Area (After heating at 1200° C.) | m²/g | 5.3 | 3.5 | 0.8 | 1.5 |

The porous composite 1 of Example 1 was produced by the aforementioned production method including steps S11 to S14. In step S11, 1.18 g of a dispersant, 4.73 g of carbon black, 12.65 g of $CeO_2$ (product name A), 32.04 g of $Pr_6O_{11}$, 14.85 g of graphite, 1.42 g of a flocculating agent, 1.31 g of a polymer flocculating agent, and 525 g of polymer for viscosity adjustment were added to 1564.13 g of water so as to obtain 2100 milliliters (mL) of slurry in total. Then, this slurry was sifted through a 250-μm sieve to obtain raw slurry in which flocculated particles had particle diameters of approximately 13 μm. Thereafter, the raw slurry was supplied to the base material 2 by an amount necessary for achieving the aforementioned thickness so as to form the aforementioned intermediate in step S12. The base material 2 had a mean pore diameter of 12 μm and a porosity of 48%.

$CeO_2$ (product name A) and $Pr_6O_{11}$ in the raw slurry are materials constituting the collection layer 3, and are hereinafter referred to as "collection layer material". In Tables 1 to 4, "$Pr_6O_{11}$ volume percentage (% by volume)" in the tables is a percentage of volume of $Pr_6O_{11}$ powder in the total volume of the collection layer material powder before addition to water in step S11. "$Pr_6O_{11}$ weight percentage (% by weight)" in the tables is a percentage of weight of $Pr_6O_{11}$ in the total weight of the collection layer material in step S11. "Pr weight percentage (% by weight)" in the tables is a percentage of weight of Pr element in the total weight of Ce and Pr elements in the collection layer material in step S11. This Pr weight percentage is also a percentage of Pr element contained in the collection layer 3 generated in step S14. The percentage of Pr element contained in the collection layer 3 can be measured by EDS (Energy Dispersive X-ray Spectrometer). In Example 1, the $Pr_6O_{11}$ volume percentage, the $Pr_6O_{11}$ weight percentage, and the Pr weight percentage were 75% by volume, 71.7% by weight, and 72.0% by weight, respectively.

In step S13, the intermediate was dried for 12 hours with air blow at room temperature, and was further dried for 12 hours in a dryer at 80° C. In step S14, firing was conducted at 1200° C. for two hours to form the collection layer 3 on the base material 2. In the case where there was an insufficient amount of raw slurry for achieving the desired thickness of the collection layer 3, raw slurry was generated at the same ratio as the aforementioned ratio. The production of Example 4 and the production of Example 7 were the same as the above except that the types of $CeO_2$ were changed to the product names B and C, respectively.

The production of Example 2 was the same as that of Example 1 except that the weights of $CeO_2$ (product name A) and $Pr_6O_{11}$ were changed to $CeO_2$ (product name A) 25.31 g and $Pr_6O_{11}$ 21.36 g. In Example 2, the $Pr_6O_{11}$ volume percentage, the $Pr_6O_{11}$ weight percentage, and the Pr weight percentage were 50% by volume, 45.8% by weight, and 46.2% by weight, respectively. The production of Example 5 and the production of Example 8 were the same as that of Example 2 except that the types of $CeO_2$ were changed to the product names B and C, respectively.

The production of Example 3 was the same as that of Example 1 except that the weights of $CeO_2$ (product name A) and $Pr_6O_{11}$ were changed to $CeO_2$ (product name A) 37.96 g and $Pr_6O_{11}$ 10.68 g. In Example 3, the $Pr_6O_{11}$ volume percentage, the $Pr_6O_{11}$ weight percentage, and the Pr weight percentage were 25% by volume, 22.0% by weight, and 22.2% by weight, respectively. The production of Example 6 and the production of Example 9 were the same as that of Example 3 except that the types of $CeO_2$ were changed to the product names B and C, respectively.

The production of Example 10 was the same as that of Example 1 except that the raw slurry was prepared without addition of $CeO_2$ and the additive amount of $Pr_6O_{11}$ was changed to 42.72 g. In Example 10, the $Pr_6O_{11}$ volume percentage, the $Pr_6O_{11}$ weight percentage, and the Pr weight percentage were 100% by volume, 100% by weight, and 100% by weight, respectively.

The production of Comparative Example 1 was the same as that of Example 1 except that the raw slurry was prepared without addition of $Pr_6O_{11}$ and the additive amount of $CeO_2$ (product name A) was changed to 50.61 g. In Comparative Example 1, the $Pr_6O_{11}$ volume percentage, the $Pr_6O_{11}$ weight percentage, and the Pr weight percentage were 0% by volume, 0% by weight, and 0% by weight, respectively. The production of Comparative Example 2 and the production of Comparative Example 3 were the same as that of Comparative Example 1 except that the types of $CeO_2$ were changed to the product names B and C, respectively.

The thicknesses of the collection layers 3 of Examples 1 to 10 were approximately 25 μm. The thicknesses of the collection layers of Comparative Examples 1 to 3 were also approximately 25 μm. These thicknesses were measured by the aforementioned method using the 3D-shape measuring device. These thicknesses are each an average value of thicknesses obtained by measuring two positions in each of a central portion (a position of 63 mm from the upper end), an upper portion (a position of 25 mm from the upper end), and a lower portion (a position of 25 mm from the lower end) in the longitudinal direction of the porous composite 1 having a length of 120 mm.

The "reaction layer thickness" in the tables is the thickness of a layer generated by penetration of $Pr_6O_{11}$ contained in the collection layer 3 into the base material 2 at the time when the collection layer 3 is generated by sintering. The thickness of the reaction layer is the distance, with respect to a depth direction perpendicular to the interface between the collection layer 3 and the base material 2, from the interface to the lower end of the reaction layer (that is, the end opposite to the interface in the depth direction).

Figure 5:
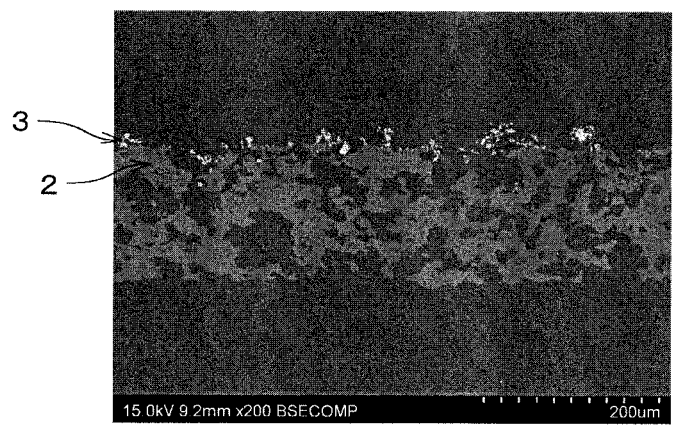
FIG. 5 is an SEM image of a section of the porous composite.
Figure 6:
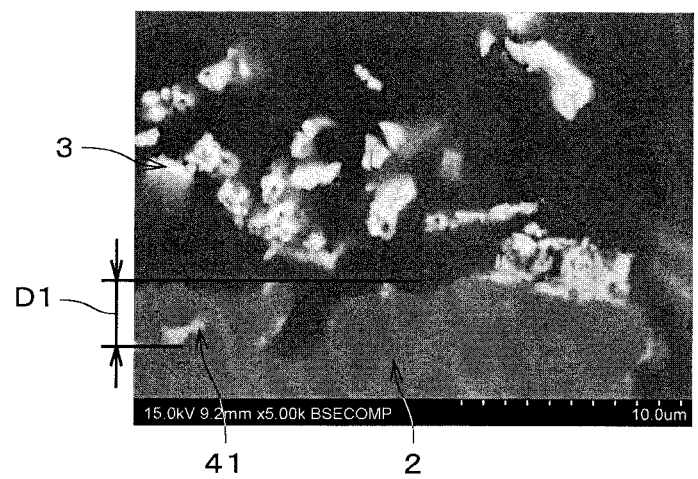
FIG. 6 is an SEM image of a section of the porous composite.

FIG. 5 is an SEM (Scanning Electron Microscope) image of a section of the porous composite 1 of Example 10. The SEM image in FIG. 5 is an image magnified 200 times. FIG. 6 is an SEM image where the vicinity of the collection layer 3 of FIG. 5 is magnified. The SEM image in FIG. 6 is an image magnified 5000 times. The white portions in FIGS. 5 and 6 are the collection layer 3, and the gray portions lighter than the background are the base material 2. The portion surrounded by the chain double-dashed line in FIG. 6 is the aforementioned reaction layer 41. The thickness of the reaction layer 41 is indicated by the reference sign D1 in FIG. 6.

The thicknesses of the reaction layers 41 of Examples 1 to 10 were less than or equal to 5 μm, and the thicknesses of the reaction layers 41 of Examples 1 to 9 were less than or equal to 3 μm. The thicknesses of the reaction layers 41 of Examples 2, 3, 5, 6, 8 and 9 were 1 μm. In other words, when the Pr percentage is less than or equal to 75% by weight (more preferably less than or equal to 72% by weight), the reaction between $Pr_6O_{11}$ and the base material 2 at the time of firing can be inhibited, and the thickness of the reaction layer 41 can be reduced.

In Examples 1 to 10, the firing temperature in step S14 was 1200° C. as described above, but the firing temperature may be changed as appropriate. On the other hand, when the firing temperature becomes high, the penetration of $Pr_6O_{11}$ into the base material 2 increases, and the thickness of the reaction layer 41 increases. For example, when the firing temperature of Example 10 is changed to 1220° C., a portion where the thickness of the reaction layer 41 is 10 μm or more appears. When the firing temperature of Example 10 is changed to 1350° C., most of $Pr_6O_{11}$ in the raw slurry penetrate into the base material 2.

The "binding force with base material" in the tables indicates the magnitude of the binding force between the collection layer 3 and the base material 2. The double circle in the tables indicates a large binding force, the single circle indicates a smaller binding force than the double circle, and the triangle indicates a smaller binding force than the single circle. The evaluation of the binding force was conducted by blowing air on the porous composite 1 and observing the state of separation of the collection layer 3 from the base material 2. The air was blown on the collection layer 3 which was exposed by cutting the porous composite 1 by a plane parallel to the longitudinal direction, from a position about 5 cm away from the surface of the collection layer 3. Then, it was visually confirmed whether or not the powder of the collection layer 3 was scattered, and it was determined that the binding force was smaller as the degree of scattering was larger.

The binding forces of Examples 1 to 9 were larger than that of Example 10. That is, when the Pr percentage is less than or equal to 75% by weight (more preferably less than or equal to 72% by weight), the binding force between the collection layer 3 and the base material 2 becomes large, so that the collection layer 3 can be firmly fixed to the base material 2. The binding forces of Examples 2, 3, 5, 6, 8 and 9 out of Examples 1 to 9 were still larger than those of Examples 1, 4 and 7. Therefore, from the viewpoint of more firmly fixing the collection layer 3 to the base material 2, the Pr percentage is more preferably less than or equal to 50% by weight (further preferably less than or equal to 46.2% by weight).

The "combustion starting temperature" in the tables was obtained by the following method. First, the raw slurry used for forming the collection layer 3 of the porous composite 1 was fired in substantially the same manner as the formation of the collection layer 3, to generate fired powder of the collection layer material. Specifically, the raw slurry was dried in a dryer at 80° C. for 72 hours and then fired at 1200° C. for 2 hours, to obtain fired powder of the collection layer material. After the above firing, the collection layer material may be made into powder by loosening if necessary.

Subsequently, soot (so-called gasoline soot) obtained by burning gasoline was mixed at 5% by weight with the fired powder of the collection layer material, and lightly stirred with a spatula or the like. Therefore, the soot and the fired powder of the collection layer material were in a loose contact (LC) state close to the contact state between the particulate matter collected by the collection layer 3 and the collection layer 3. Then, the mixed powder of the soot and the fired powder of the collection layer material was subjected to measurement using a TPD-MS system (thermal evolved gas analysis). The TPD-MS system measured a change in the concentration of the gas evolved from the sample (i.e., the above mixed powder) that were heated in accordance with a predetermined heating-up program. Then, the base line of a detection peak of carbon monoxide (CO) was set, and a temperature at which the area of the detection peak became 20% thereof was set as a temperature at which oxidation of the soot had occurred (i.e., combustion starting temperature). In the following description, the combustion starting temperature is referred to as an "LC combustion starting temperature".

The LC combustion starting temperature in the tables obtained by the above method is substantially the same as the actual combustion starting temperature of the particulate matter collected by the collection layer 3 of the porous composite 1. The magnitude relationship of the LC combustion starting temperature in the tables with the composition of the collection layer material is also substantially the same as the magnitude relationship of the actual combustion starting temperature of the particulate matter.

Figure 7:
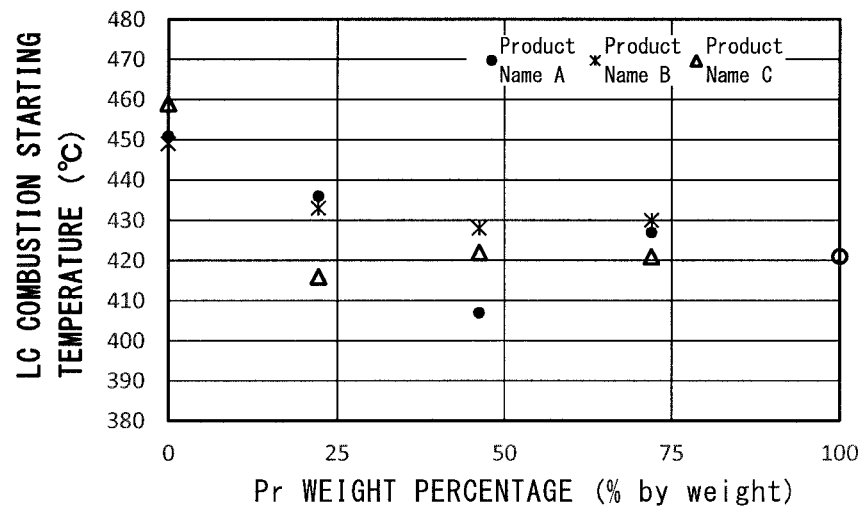
FIG. 7 is a diagram of relationship between Pr weight percentage and combustion starting temperature.

FIG. 7 is a diagram in which the LC combustion starting temperatures in Examples 1 to 10 and Comparative Examples 1 to 3 are plotted with the horizontal axis as the Pr weight percentage (% by weight). The solid circles in FIG. 7 indicate Comparative Example 1 and Examples 1 to 3 in which $CeO_2$ (product name A) is contained in the collection layer material. Asterisks in FIG. 7 indicate Comparative Example 2 and Examples 4 to 6 in which $CeO_2$ (product name B) is contained in the collection layer material. The triangles in FIG. 7 indicate Comparative Example 3 and Examples 7 to 9 in which $CeO_2$ (product name C) is contained in the collection layer material. The hollow circle in FIG. 7 indicates Example 10 in which the collection layer material does not contain $CeO_2$.

As shown in Tables 1 to 4 and FIG. 7, in Examples 1 to 10 in which the collection layer material contained praseodymium oxide, the LC combustion starting temperatures were 405° C. to 440° C. On the other hand, in Comparative Examples 1 to 3 in which the collection layer material did not contain praseodymium oxide, the LC combustion starting temperatures were 445° C. to 460° C. In the porous composite 1, since the collection layer 3 contains praseodymium oxide, the combustion starting temperature of the particulate matter collected by the collection layer 3 can be reduced. In other words, since the collection layer 3 contains praseodymium oxide, it is possible to accelerate the oxidation of the particulate matter collected by the collection layer 3.

In Table 6, the combustion starting temperatures (hereinafter, referred to as "TC combustion starting temperature") obtained by a method different from the above method are shown for Examples 2, 5, 8 and 10 and Comparative Examples 1 to 3.

collection layer 3 is provided on the base material 2. The collection layer 3 contains praseodymium oxide. This makes it possible to accelerate oxidation of particulate matter collected by the porous composite 1 and to reduce the combustion starting temperature of the particulate matter.

As described above, the collection layer 3 preferably contains $CeO_2$ (Examples 1 to 9). Therefore, the binding force between the collection layer 3 and the base material 2 can be increased as compared with the case where the

TABLE 6

|  |  | Example 2 | Example 5 | Example 8 | Example 10 | Comparative Example 1 | Comparative Example 2 | Comparative Example 3 |
|---|---|---|---|---|---|---|---|---|
| Collection Layer Material |  | $Pr_6O_{11}$ + $CeO_2$ | $Pr_6O_{11}$ + $CeO_2$ | $Pr_6O_{11}$ + $CeO_2$ | $Pr_6O_{11}$ | $CeO_2$ | $CeO_2$ | $CeO_2$ |
| Product Name of $CeO_2$ |  | A | B | C | — | A | B | C |
| TC Combustion Starting Temperature | °C. | 374 | 367 | 377 | 378 | 494 | 546 | 495 |

The "TC combustion starting temperature" in Table 6 was obtained by the following method. First, fired powder of the collection layer material was generated from the raw slurry in the same manner as the aforementioned obtainment of the LC combustion starting temperature. Subsequently, mixed powder obtained by adding carbon black powder as a substitute for the above soot to the fired powder of the collection layer material was placed in a mortar and mixed well with a pestle. Therefore, the carbon black and the fired powder of the collection layer material were in a tight contact (TC) state in which they are in closer contact with each other than the loose contact state described above.

Figure 8:
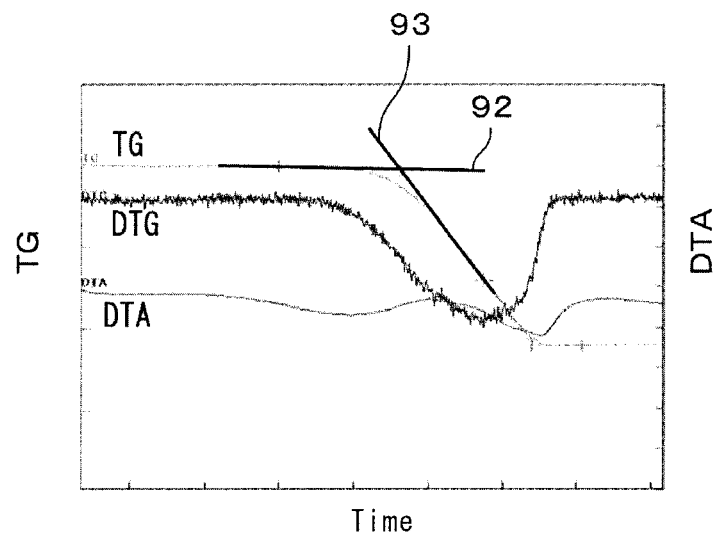
FIG. 8 is a diagram of measurement results by TG-DTA.

Then, the mixed powder of carbon black and the fired powder of the collection layer material was measured by a TG-DTA (thermogravimetry-differential thermal analysis) system, and a TG curve, a DTG curve (that is, differential curve of TG), and a DTA curve were obtained as illustrated in FIG. 8. The weight ratio of carbon black to the collection layer material in the mixed powder was 1:19. The rate of temperature rise in the TG-DTA system was 20° C./min.

Next, in FIG. 8, a portion of the TG curve where the slope was constant was extracted based on the DTG curve, and a tangent line 92 to the TG curve was drawn at a point where the straight line overlapping the portion and the TG curve were separated. Additionally, a point on the TG curve having the maximum slope (that is, a point having the maximum combustion speed) was extracted based on the DTG curve, and a tangent line 93 to the TG curve at the point was drawn. Then, the temperature at the intersection of the tangent line 92 and the tangent line 93 was acquired as the aforementioned TC combustion starting temperature.

As shown in Table 6, in Examples 2, 5, 8 and 10 in which the collection layer material contained praseodymium oxide, the TC combustion starting temperatures were 365° C. to 380° C. On the other hand, in Comparative Examples 1 to 3 in which the collection layer material did not contain praseodymium oxide, the TC combustion starting temperatures were 490° C. to 550° C. The combustion starting temperature of carbon black alone is 610° C. From the TC combustion starting temperature shown in Table 6, it can be seen that the combustion starting temperature of the particulate matter collected by the collection layer 3 is reduced since the collection layer 3 contains praseodymium oxide.

As described above, the porous composite 1 includes the porous base material 2 and the porous collection layer 3. The collection layer 3 does not contain $CeO_2$ (Example 10). As a result, the collection layer 3 can be firmly fixed to the base material 2.

As described above, the percentage of Pr element contained in the collection layer 3 is preferably greater than or equal to 5% by weight and less than or equal to 75% by weight. Therefore, the binding force between the collection layer 3 and the base material 2 can be further increased. As a result, the collection layer 3 can be more firmly fixed to the base material 2. Additionally, this makes it possible to reduce the thickness of the reaction layer 41. That is, the penetration of praseodymium oxide into the base material 2 can be reduced, and thus it is possible to suppress a decrease in strength of the base material 2 due to the penetration. From the viewpoint of suppressing the decrease in strength of the base material 2, with respect to the depth direction perpendicular to the interface between the collection layer 3 and the base material 2, the reaction layer 41 of the base material 2 and praseodymium oxide more preferably has a thickness less than or equal to 3 μm from the interface.

In the aforementioned porous composite 1, the base material 2 preferably has the honeycomb structure whose inside is partitioned into the plurality of cells 23 by the partition wall 22 and in which at least some of the cells 23 among the plurality of cells 23 have inner surfaces covered with the collection layer 3. The porous composite 1 with this structure can achieve both of favorably collecting particulate matter and suppressing pressure loss. As described above, the porous composite 1 can accelerate the oxidation of the collected particulate matter and can also reduce the combustion starting temperature of the particulate matter. Accordingly, the porous composite 1 is in particular suitable for use as a GPF for collecting particulate matter in an exhaust gas emitted from a gasoline engine.

Figure 9:
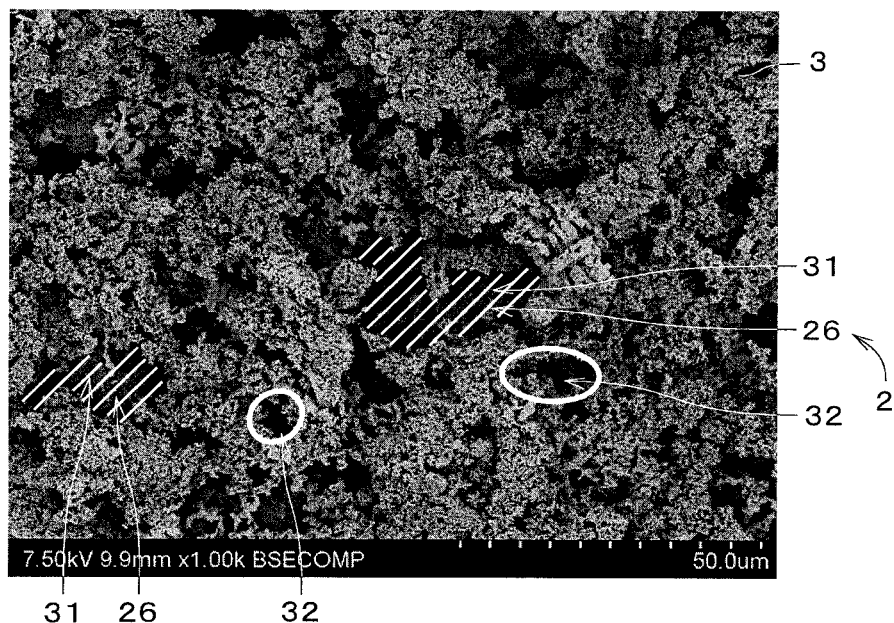
FIG. 9 is an SEM image of a surface of a collection layer.

FIG. 9 is an SEM image of the inner surface of a cell 23 with the collection layer 3 formed thereon in the porous composite 1 of Example 2 described above. In other words, FIG. 9 is an SEM image of the surface of the collection layer 3. The SEM image in FIG. 9 is an image magnified 1000 times. The collection layer 3 includes a plurality of small pores 32 as indicated by thick lines, which enclose some of the small pores 32 in FIG. 9. As described above, the small pores 32 are pores formed principally by removing particles of the pore-forming agent by combustion. The diameters of the small pores 32 measured in the SEM image are, for example, greater than or equal to 3 µm and less than or equal to 20 µm.

The collection layer 3 also includes a plurality of large pores 31 larger than the small pores 32 as indicated by cross-hatching, which is applied to some of the large pores 31 in FIG. 9. As shown in the SEM image in FIG. 9, the surface of the base material 2 is exposed through each of the large pores 31. The state in which the surface of the base material 2 is exposed refers to a state in which an aggregate of the base material 2 or openings in the surface of the base material 2 are not covered with the collection layer 3 and visually recognizable in the SEM image of the surface of the collection layer 3.

The large pores 31 are regions that have remained without being covered with a plurality of collection layer particles at the time when the collection layer particles bind together while spreading over the surface of the base material 2 (i.e., while covering the surface of the base material 2) in the aforementioned firing process in step S14. Note that the large pores 31 differ from non-attaching regions that are formed when a layer of particles adhering to the surface of the base material 2 in step S12 is delaminated from the base material 2 in relatively wide ranges for some reason before the firing process in step S14.

The diameter of each large pore 31 measured in the SEM image is, for example, greater than or equal to 6 µm and less than or equal to 50 µm. The diameter of each large pore 31 refers to the diameter of each exposed region 26 of the base material 2 exposed through the large pore 31. For example, each exposed region 26 has a perimeter greater than or equal to 18 µm and less than or equal to 500 µm. The area of each exposed region 26 is, for example, greater than or equal to 25 µm$^2$ and less than or equal to 2000 µm$^2$. The area of each exposed region 26 refers to the area of a region of the base material 2 that is exposed through each large pore 31 in the case where it is assumed that openings (i.e., pores) in the surface of the base material 2 are filled up.

In the case where a plurality of large pores 31 adjacent to one another in the surface of the base material 2 are connected and regarded as one large pore 31 of the collection layer 3, the exposed region 26 corresponding to this one large pore 31 has a greater diameter, a greater perimeter, and a greater area than those in the above-described ranges. Even in the case where a pore in the collection layer 3 has a greater diameter or other sizes than the large pores 31, if the base material 2 is not exposed through this pore, the pore is not regarded as a large pore 31.

In the porous composite 1, a sum of the areas of the exposed regions 26 that are each exposed through each large pore 31 (i.e., a sum total area of a plurality of exposed regions 26) in each cell 23 with the collection layer 3 formed thereon is greater than or equal to 1% of the total area of the collection layer 3 in the cell 23 and less than or equal to 50% thereof. The total area of the collection layer 3 in each cell 23 refers to the area of the entire surface of the collection layer 3 in plan view in the case where it is assumed that a plurality of large pores 31 included in the collection layer 3 are filled up. The sum total area of a plurality of exposed regions 26 in each cell 23 is preferably greater than or equal to 10% of the total area of the collection layer 3 in the cell 23, and more preferably greater than or equal to 20% thereof. The sum total area of a plurality of exposed regions 26 in each cell 23 is also preferably less than or equal to 50% of the total area of the collection layer 3 in the cell 23, and more preferably less than or equal to 40% thereof.

In the porous composite 1, in the case where the surface of the collection layer 3 is captured at a plurality of arbitrary positions on the collection layer 3 at 1000 times magnification by an SEM, 90% or more of a plurality of captured magnified images include some of the plurality of large pores 31. The areas of fields of view of these magnified images are in the range of 11000 µm$^2$ to 13000 µm$^2$ and are, for example, 12048 µm$^2$. For example, these magnified images are acquired by an SEM "S-3400N" manufactured by Hitachi High Technologies, Inc.

The number of large pores 31 included in each of the aforementioned 90% or more images (i.e., magnified images including large pores 31) is, for example, greater than or equal to one and less than or equal to eight. In the case of obtaining the number of large pores 31 in each magnified image, even a large pore 31 that is included only in part in the magnified image is also counted as one large pore, like the large pores 31 that are included in their entirety in the magnified image.

Figure 10:
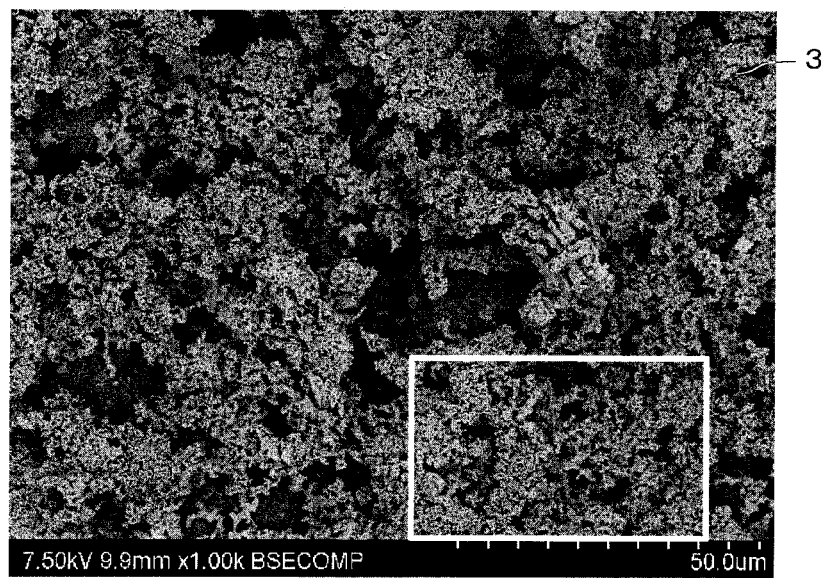
FIG. 10 is an SEM image of the surface of the collection layer.

Next, one example of the method for detecting the small pores 32 in the collection layer 3 will be described. FIG. 10 is an SEM image of the surface of the collection layer 3. The SEM image in FIG. 10 is an image magnified 1000 times. In the case of detecting the small pores 32, first a region that includes no large pores 31 is extracted from the SEM image as indicated by a thick line that encloses a rectangle. Then, this region (hereinafter, referred to as a "region of interest") is subjected to image processing using image analysis software. For example, image analysis software "Image-Pro ver. 9.3.2" manufactured by Nippon Roper K. K. is used.

Figure 11:
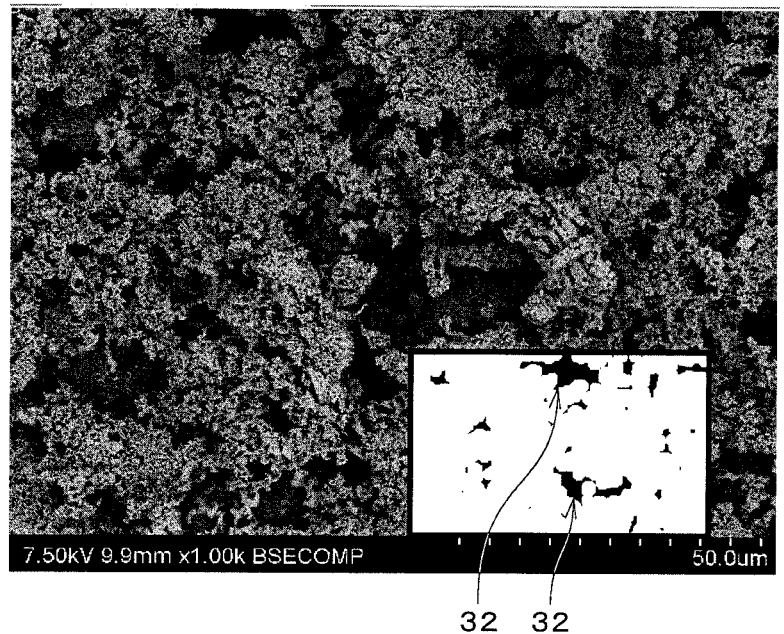
FIG. 11 is an SEM image of the surface of the collection layer after image processing.

The above image processing involves first "Blur 100%" processing under "Process¥2D Filters" and then "Watershed 16 Neighboring" Processing under "Process¥2D Filters¥Morphological." Then, "Dilation with 5×5 Circle" processing under "Process¥2D Filters¥Morphological" is repeated five times. Next, the region of interest is binarized as illustrated in FIG. 11. Thereafter, the number of black regions with sizes falling within a predetermined range is counted in the region of interest in FIG. 11 so as to acquire the number of small pores 32 included in the region of interest.

Figure 12:
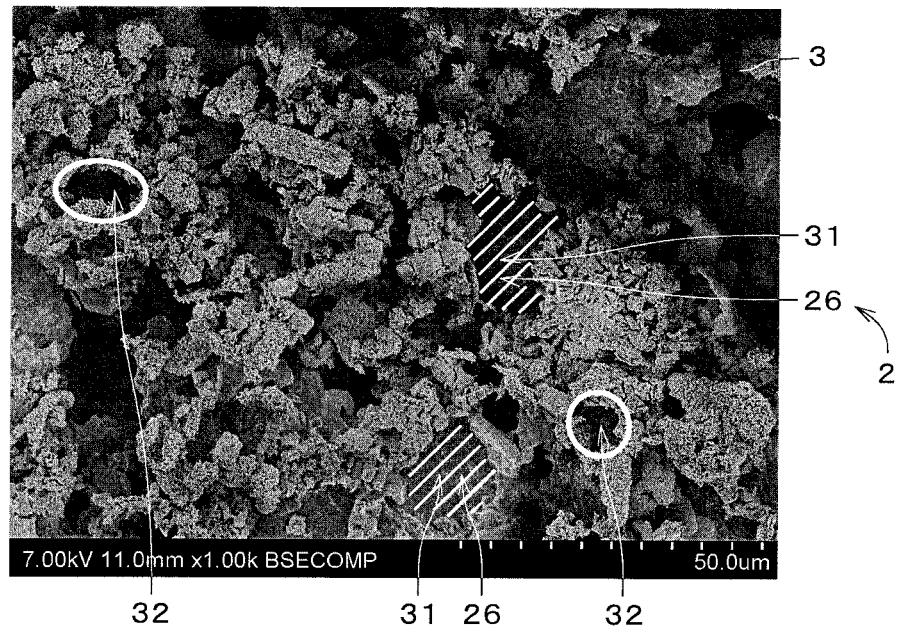
FIG. 12 is an SEM image of the surface of the collection layer.
Figure 13:
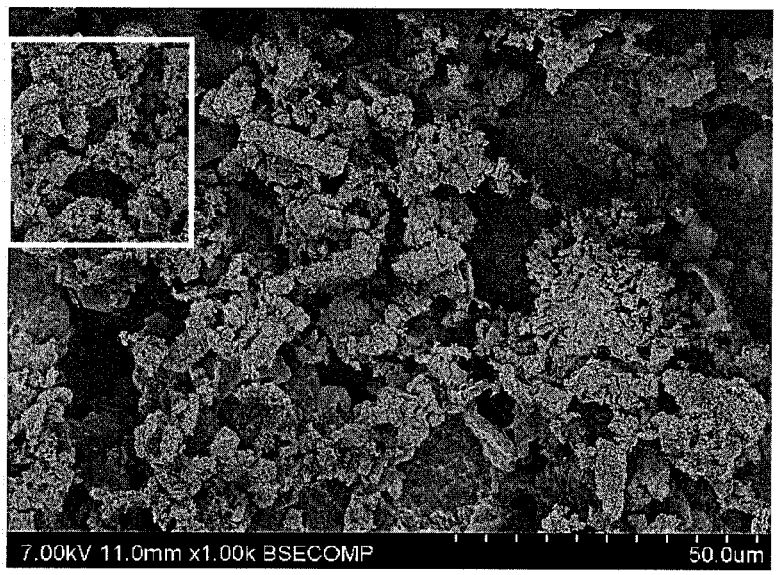
FIG. 13 is an SEM image of the surface of the collection layer.
Figure 14:
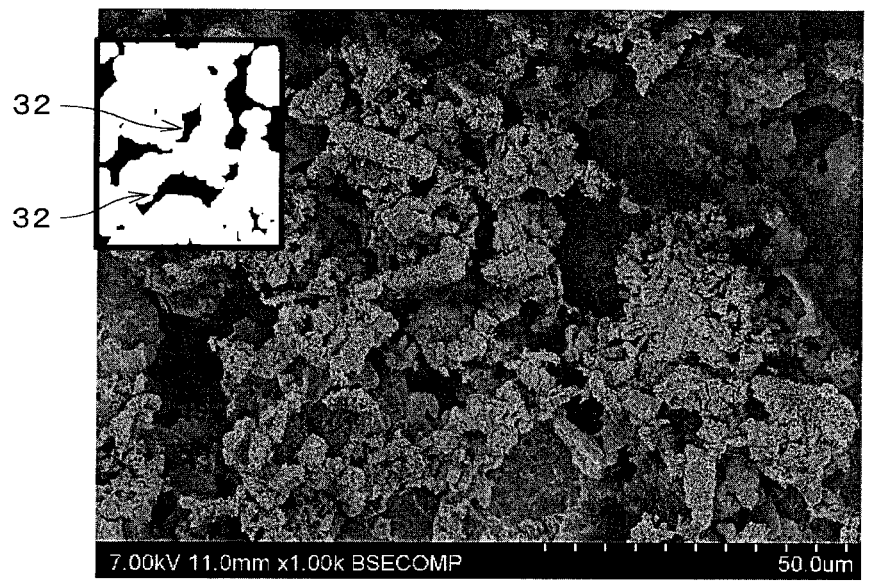
FIG. 14 is an SEM image of the surface of the collection layer after image processing.

FIGS. 12 to 14 are views of the above Example 5, and correspond to FIGS. 9 to 11 (Example 2). The images shown in FIGS. 12 to 14 are obtained by the same method as in FIGS. 9 to 11, respectively. FIG. 12 is an SEM image of the surface of the collection layer 3 as in FIG. 9. In the porous composite 1 of Example 5, as in Example 2, the collection layer 3 includes a plurality of large pores 31 and a plurality of small pores 32. The diameters of the small pores 32 measured in the SEM image are, for example, greater than or equal to 3 µm and less than or equal to 20 µm. In Example 5, as in Example 2, the diameter of each large pore 31 measured in the SEM image is, for example, greater than or equal to 6 µm and less than or equal to 50 µm. For example, each exposed region 26 has a perimeter greater than or equal to 18 µm and less than or equal to 500 µm. The area of each exposed region 26 is, for example, greater than or equal to 25 µm$^2$ and less than or equal to 2000 µm$^2$.

In Example 5, as in Example 2, a sum of the areas of the exposed regions 26 that are each exposed through each large pore 31 (i.e., a sum total area of a plurality of exposed regions 26) in each cell 23 with the collection layer 3 formed thereon is greater than or equal to 1% of the total area of the collection layer 3 in the cell 23 and less than or equal to 50% thereof. The sum total area of a plurality of exposed regions 26 in each cell 23 is preferably greater than or equal to 10% of the total area of the collection layer 3 in the cell 23, and more preferably greater than or equal to 20% thereof. The sum total area of a plurality of exposed regions 26 in each cell 23 is also preferably less than or equal to 50% of the total area of the collection layer 3 in the cell 23, and more preferably less than or equal to 40% thereof.

In Example 5, as in Example 2, in the case where the surface of the collection layer 3 is captured at a plurality of arbitrary positions on the collection layer 3 at 1000 times magnification by an SEM, 90% or more of a plurality of captured magnified images include some of the plurality of large pores 31. The number of large pores 31 included in each of the aforementioned 90% or more images (i.e., magnified images including large pores 31) is, for example, greater than or equal to one and less than or equal to eight.

FIG. 13 is an SEM image of the surface of the collection layer 3 as in FIG. 10. FIG. 14 is an image where the region of interest shown in FIG. 13 is binarized as in FIG. 11. The number of black regions with sizes falling within a predetermined range is counted in the region of interest in FIG. 14 so as to acquire the number of small pores 32 included in the region of interest.

Figure 15:
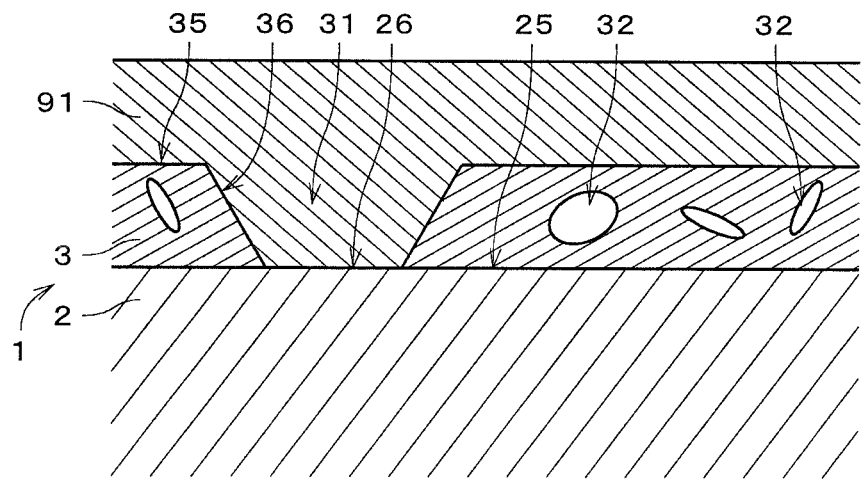
FIG. 15 is a schematic diagram of sections of the collection layer and a base material.

FIG. 15 is a sectional view in which sections of the collection layer 3 and the base material 2 of the porous composite 1 are schematically illustrated. Pores of the base material 2 and pores of the collection layer 3 other than the large pores 31 and the small pores 32 are not illustrated in FIG. 15. In FIG. 15, a layer of particulate matter (hereinafter, referred to as a "particulate matter layer 91") collected by the collection layer 3 is also illustrated. As illustrated in FIG. 15, the particulate matter layer 91 is in contact with an upper surface 35 of the collection layer 3 (i.e., the surface on the side opposite to the base material 2). The particulate matter layer 91 is also in contact with a side surface 36 of a large pore 31 inside the large pore 31 of the collection layer 3. In FIG. 15, a section of a region is illustrated in which the small pores 32 exist only inside the collection layer 3 and do not exist in the upper surface 35 of the collection layer 3.

The side surface 36 of a large pore 31 is a generally tubular region between the periphery of the large pore 31 in the upper surface 35 of the collection layer 3 and the periphery of an exposed region 26 of the base material 2. In other words, the side surface 36 of a large pore 31 is a generally tubular virtual surface that extends from the periphery of the exposed region 26 in a direction away from the base material 2 along the surface of the collection layer 3. In the example illustrated in FIG. 15, the side surface 36 of a large pore 31 is an inclined surface whose diameter increases as the distance from an interface 25 between the collection layer 3 and the base material 2 increases (i.e., an inclined surface extending away from the periphery of the exposed region 26 radially outward). The presence of large pores 31 in the collection layer 3 increases an accessible area between the collection layer 3 and the particulate matter layer 91.

Figure 16:
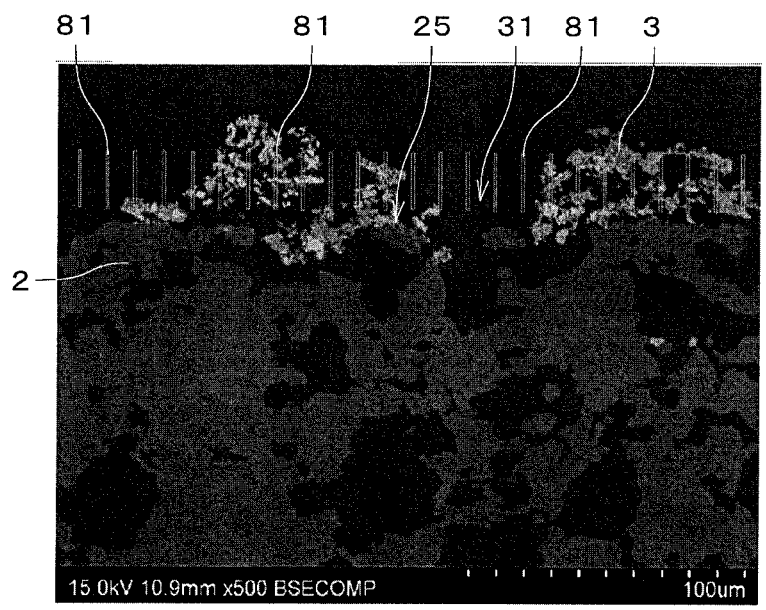
FIG. 16 is an SEM image of the sections of the collection layer and the base material.
Figure 17:
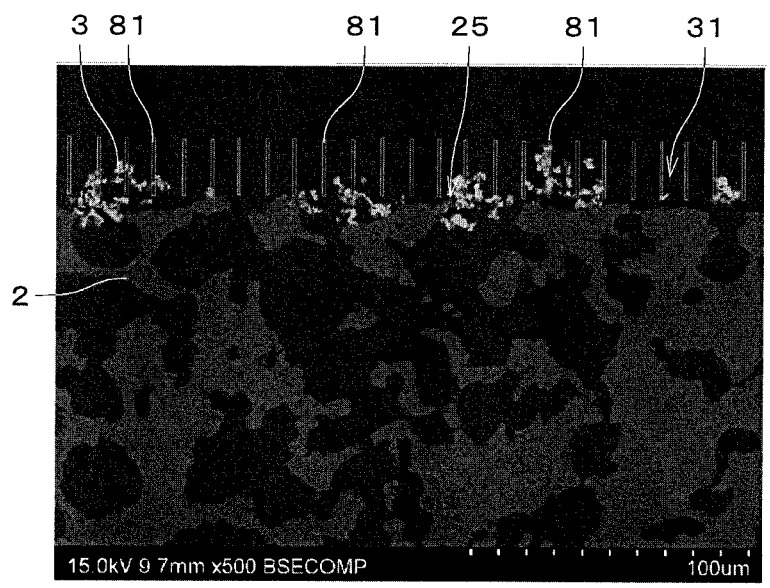
FIG. 17 is an SEM image of the sections of the collection layer and the base material.
Figure 18:
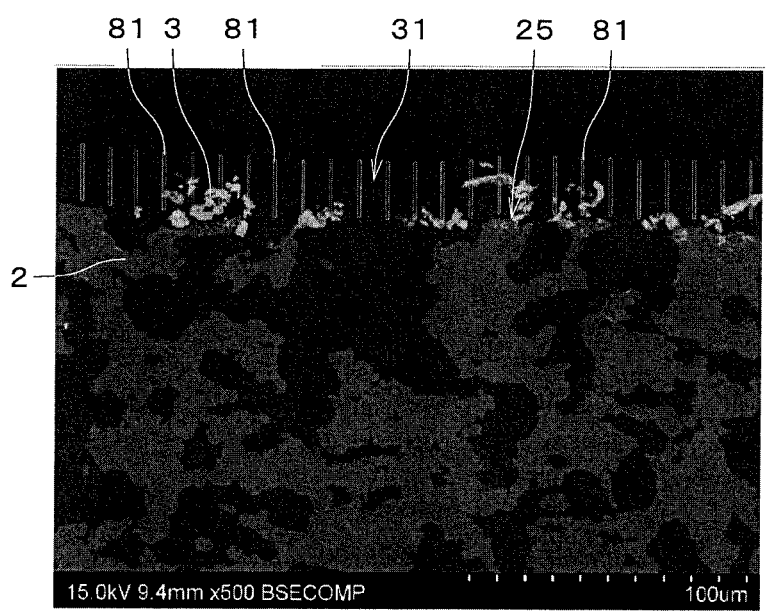
FIG. 18 is an SEM image of the sections of the collection layer and the base material.

In the case of confirming the presence of large pores 31 in the collection layer 3, the exposed regions of the base material 2 are not necessarily extracted through visual inspection of an SEM image of the surface of the collection layer 3, and the presence of large pores 31 may be confirmed by other methods. For example, the presence or absence of large pores 31 may be confirmed through image analysis using an SEM image of sections of the collection layer 3 and the base material 2 illustrated in FIGS. 16 to 18. The SEM image in FIG. 16 is an image at 500 times magnification of the collection layer 3 and the base material 2 of Example 2. The SEM images in FIGS. 17 and 18 are images at 500 times magnification of the collection layer 3 and the base material 2 of Examples 5 and 8. In FIGS. 16 to 18, the collection layer 3 is located on the upper side of the base material 2. The image analysis using these images may be implemented by using, for example, the aforementioned image analysis software "Image-Pro ver. 9.3.2."

In the case of confirming the presence or absence of large pores 31 with use of the SEM image in FIG. 16, first a plurality of inspection region 81 are set in a region, where the collection layer 3 exists, in the SEM image. The inspection regions 81 are arranged at an equal interval in a direction of arrangement along the interface 25 between the collection layer 3 and the base material 2 (i.e., a generally left-right direction in the image). Each inspection region 81 is a generally rectangular region. The width of each inspection region 81 in the left-right direction is 1 μm, and the length thereof in the up-down direction is 20 μm. The pitch of the inspection regions 81 in the direction of arrangement is 10 μm. The position of the lower end of each inspection region 81 in the up-down direction is approximately the same as the position of the interface 25 between the collection layer 3 and the base material 2 in the up-down direction.

Then, for each inspection region 81, the area of collection layer particles included in the inspection region 81 (i.e., a sum total area of white pixels included in the inspection region 81 in the binarized image in FIG. 16) is obtained. In the case where the area of collection layer particles included in the inspection region 81 is 0 μm$^2$, there is no collection layer 3 on the base material 2 at a position in which this inspection region 81 is set. In the case where there are two or more consecutive inspection regions 81 in the direction of arrangement in which the area occupied by the collection layer particles is 0 μm$^2$, it is determined that a large pore 31 exposing the base material 2 exists in a region where these two or more inspection regions 81 are set. For example, in the SEM image illustrated in FIG. 16, it is determined that a large pore 31 exists at a position in which the ninth to eleventh inspection regions 81 from the right are set.

Also in the SEM image of FIG. 17 or FIG. 18, the presence or absence of large pores 31 can be confirmed by the above method. In the SEM image illustrated in FIG. 17, it is determined that a large pore 31 exists at a position in which the second to fifth inspection regions 81 from the right are set. In the SEM image illustrated in FIG. 18, it is determined that a large pore 31 exists at a position in which the eleventh to twelfth inspection regions 81 from the left are set.

In the SEM images in FIGS. 16 to 18, in the case where the area of collection layer particles included in an inspection region 81 is, for example, greater than 0% of the total area of the inspection region 81 and less than 10% thereof, it may be determined that a small pore 32 exists in the collection layer 3 at a position in which this inspection region 81 is set.

In Table 7, the characteristics of the large pores 31 of the collection layer 3 in the porous composite 1 of Examples 2, 5 and 8 are shown.

TABLE 7

| | | | Example 2 | Example 5 | Example 8 |
|---|---|---|---|---|---|
| Thickness | | (μm) | 25 | 25 | 26 |
| The Number of Large Pores | | | 11 | 8 | 7 |
| Exposed Region | Diameter Distribution | (μm) | 6~23 | 17~35 | 13~34 |
| | Average Diameter | (μm) | 10.5 | 25.3 | 21.9 |
| | Sum Total Perimeter | (μm) | 354 | 477 | 381 |
| | Sum Total Area | (μm$^2$) | 749 | 2806 | 1876 |
| | Area Ratio | | 6% | 23% | 16% |
| Rate of Collection | | | 80%≤ | 80%≤ | 80%≤ |

In the porous composites 1 of Examples 2, 5 and 8, the collection layers 3 had large pores 31 formed therein. The number of large pores 31 in Table 7 corresponds to the number of large pores 31 included in an image (with the area of field of view of 12048 μm$^2$) of the surface of the collection layer 3 captured at 1000 times magnification by an SEM. Table 7 indicates an average value of the numbers of large pores 31 in six SEM images acquired at two positions in each of the aforementioned central, upper, and lower portions in the longitudinal direction of a porous composite 1 having a length of 120 mm. In the porous composites 1 of Examples 2, 5 and 8, large pores 31 existed in each of the aforementioned central, upper, and lower portions in the longitudinal direction.

Diameter distributions of the exposed regions 26 in Examples 2, 5 and 8 are distributions in the aforementioned six SEM images. The average diameter, sum total perimeter, and sum total area of the exposed regions 26 are average values of measured values obtained in the six SEM images. An area ratio of the exposed regions 26 is obtained by dividing the aforementioned sum total area of the exposed regions 26 by the aforementioned total area of the collection layer 3 (i.e., the area of field of view of 12048 μm$^2$). In the porous composites 1 of Examples 2, 5 and 8, rates of collection of particulate matter in the gas passing through the porous composites 1 were higher than or equal to 80%. The presence of the large pores 31 in the collection layer 3 was also confirmed in the porous composites 1 of Examples 1, 3 to 4, 6 to 7, 9 to 10.

As described above, the collection layer 3 preferably has a thickness greater than or equal to 6 μm. The collection layer 3 preferably has a plurality of large pores 31, each exposing the surface of the base material 2. A sum of the areas of the exposed regions 26 of the base material 2 that are each exposed from each large pore 31 of the plurality of large pores 31 is preferably greater than or equal to 1% of the total area of the collection layer 3 and less than or equal to 50% thereof. This allows the porous composite 1 to achieve a favorable efficiency of collecting particulate matter and to increase the accessible area between the particulate matter and the collection layer 3. As a result, it is possible to accelerate oxidation of the particulate matter collected by the porous composite 1 and to lower the combustion starting temperature of the particulate matter.

As described above, the exposed region 26 of the base material 2 exposed from each large pore 31 preferably has a perimeter greater than or equal to 18 μm and less than or equal to 500 μm. This allows the porous composite 1 to maintain a favorable collection efficiency, unlike in the case where the collection layer 3 has excessively large pores (e.g., pores formed by delamination at the time of forming the collection layer 3). It is also possible to prevent an excessive decrease in the accessible area caused by the exposed regions 26 and to efficiently increase the accessible area between the particulate matter and the collection layer 3.

As described above, among a plurality of magnified images of the surface of the collection layer 3 captured at a plurality of arbitrary positions on the collection layer 3 at 1000 times magnification by an SEM, 90% or more images preferably include some of the large pores 31. This allows the porous composite 1 to favorably achieve both of maintaining the collection efficiency and increasing the accessible area between the particulate matter and the collection layer 3. More preferably, the number of large pores 31 included in each of the 90% or more images is greater than or equal to one and less than or equal to eight. This allows the porous composite 1 to more favorably achieve both of maintaining the collection efficiency and increasing the accessible area between the particulate matter and the collection layer 3.

In the porous composite 1, the collection layer 3 preferably has pores with diameters greater than or equal to 3 μm and less than or equal to 20 μm (i.e., small pores 32) in a region other than the plurality of large pores 31. This suppresses pressure loss caused by the collection layer 3 even in a region where large pores 31 do not exist. The presence of the small pores 32 and the large pores 31 in the collection layer 3 allows the porous composite 1 to simultaneously achieve all of achieving a favorable efficiency of collecting particulate matter, increasing the accessible area between the particulate matter and the collection layer 3, and suppressing pressure loss caused by the collection layer 3.

In order for the porous composite 1 to achieve both of achieving a favorable efficiency of collecting particulate matter and increasing the accessible area between the particulate matter and the collection layer 3, the porous composite 1 does not necessarily have to include such a collection layer 3 that has large pores 31 detected in the aforementioned SEM images. For example, similar effects can also be achieved with such a porous composite 1 that includes a collection layer 3 having the following features.

These features are as follows. The collection layer 3 preferably has a thickness greater than or equal to 6 In a photograph of sections of the collection layer 3 and the base material 2 captured at 500 times magnification by an SEM, a plurality of straight lines perpendicular to the interface 25 between the collection layer 3 and the base material 2 are arranged at an equal interval along this interface, and a value obtained by dividing the number of a plurality of overlapping straight lines that overlap with pixels indicating the collection layer 3 by the total number of the plurality of straight lines is preferably greater than or equal to 50% and less than or equal to 90%. This allows the porous composite 1 to achieve a favorable efficiency of collecting particulate matter and to increase the accessible area between the particulate matter and the collection layer 3 in the same manner as described above. As a result, it is possible to accelerate oxidation of particulate matter collected by the porous composite 1 and to lower the combustion starting temperature of the particulate matter.

Specifically, in an SEM image similar to that in FIG. 16, the plurality of inspection regions 81 are replaced by straight lines each having a length of the same order as the length of the inspection regions 81 in the up-down direction, and these straight lines are arranged at a smaller pitch and in a larger number than the inspection regions 81 in the direction of arrangement (i.e., a generally left-right direction in the drawing) along the interface 25. Since the collection layer 3 exists on the aforementioned overlapping straight lines, it is possible to achieve a favorable efficiency of collecting particulate matter. Moreover, it can be thought that a substance constituting the collection layer 3 does not exist on the straight lines excluding the overlapping straight lines. Therefore, the surface of the collection layer 3 that extends in the up-down direction comes in contact with the particulate matter, which increases the accessible area between the particulate matter and the collection layer 3.

In this case, a value obtained by dividing the number of overlapping straight lines that overlap with pixels indicating the collection layer 3 by an amount less than 10% of the thickness of the collection layer 3, among the plurality of overlapping straight lines, by the total number of the aforementioned straight lines is preferably greater than or equal to 30%. This allows the porous composite 1 to simultaneously achieve all of achieving a favorable efficiency of collecting particulate matter, increasing the accessible area between the particulate matter and the collection layer 3, and suppressing pressure loss caused by the collection layer 3, in the same manner as in the case where the collection layer 3 has the aforementioned large pores 31 and small pores 32. The same applies to FIGS. 17 and 18.

The aforementioned porous composite 1 may be modified in various ways.

For example, the percentage of Pr element contained in the collection layer 3 may be less than 5% by weight or may be greater than 75% by weight. The collection layer 3 does not necessarily have to contain $CeO_2$ as long as it contains praseodymium oxide. As described above, the collection layer 3 may contain a substance other than praseodymium oxide and $CeO_2$.

In the porous composite 1, the reaction layer 41 of the base material 2 and praseodymium oxide may have a thickness greater than 3 μm. The reaction layer 41 does not necessarily have to be present.

The number of large pores 31 and the probability of the presence of large pores 31 in an SEM image of the surface of the collection layer 3, the perimeters and sizes of the exposed regions 26, and other features are not limited to the ranges described above, and may be changed in various ways.

The structure of the porous composite 1 may be modified in various ways. For example, the sealing parts 24 may be omitted from the base material 2. All of the cells 23 may have inner surfaces provided with the collection layer 3. Furthermore, the base material 2 does not necessarily have to have a honeycomb structure, and may have any other shape such as a simple tubular shape whose inside is not partitioned by a partition wall or a simple flat plate shape.

The applications of the porous composite 1 are not limited to the aforementioned GPF, and the porous composite 1 may be used as any other filter such as a diesel particulate filter (DPF). As another alternative, the porous composite 1 may be used in applications other than filters.

Figure 4:
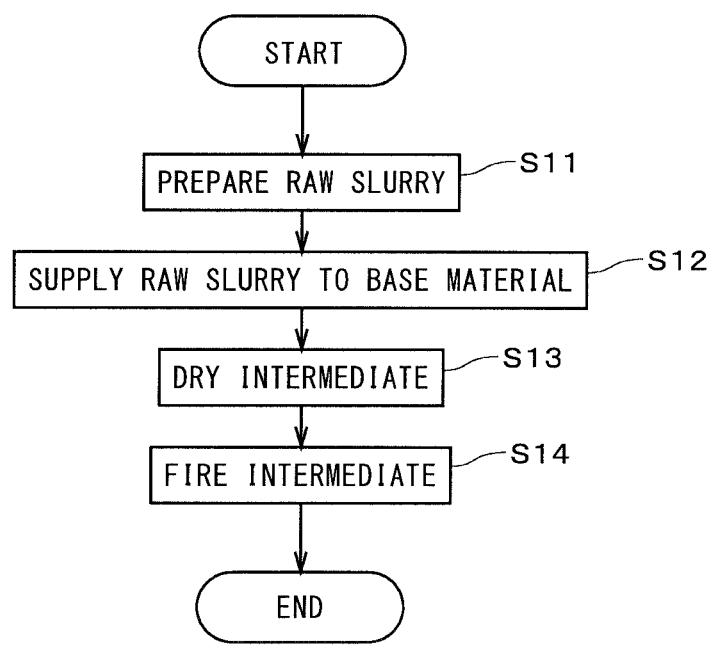
FIG. 4 is a flowchart of production of the porous composite.

The method of producing the porous composite 1 is not limited to the method illustrated in FIG. 4, and may be modified in various ways. For example, in step S12, the method of supplying the raw slurry to the base material 2 may be modified in various ways. The supply of the raw material for the collection layer 3 to the base material 2 is not limited to a filtering method using raw slurry, and may be implemented by any of various methods such as a dipping method, spraying method, and dry method. The method of drying the intermediate and drying time of the intermediate in step S13 and the firing temperature and firing time of the intermediate in step S14 may also be changed in various ways.

The configurations in the above-discussed preferred embodiments and variations may be combined as appropriate only if these do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The present invention is applicable to filters for collecting particulate matter such as a gasoline particulate filter for collecting particulate matter in an exhaust gas emitted from a gasoline engine.

REFERENCE SIGNS LIST

1 Porous composite
2 Base material
3 Collection layer
22 Partition wall
23 Cell
25 Interface
26 Exposed region
31 Large pore
32 Small pore
S11 to S14 Step

The invention claimed is:
1. A porous composite comprising:
a porous base material; and
a porous collection layer provided on said base material, wherein said collection layer contains praseodymium oxide; and
wherein with respect a depth direction perpendicular to an interface between said collection layer and said base material, a reaction layer of said base material and praseodymium oxide has a thickness less than or equal to 3 μm from said interface.
2. The porous composite according to claim 1, wherein said collection layer contains cerium oxide.
3. The porous composite according to claim 1, wherein a percentage of praseodymium element contained in said collection layer is greater than or equal to 5% by weight and less than or equal to 75% by weight.
4. The porous composite according to claim 1, wherein said collection layer has a thickness greater than or equal to 6 μm,
said collection layer has a plurality of large pores, each exposing a surface of said base material, and
a sum of areas of exposed regions of said base material that are each exposed through each large pore of said plurality of large pores is greater than or equal to 1% of a total area of said collection layer and less than or equal to 50% of the total area of said collection layer.

5. The porous composite according to claim 4, wherein said exposed regions of said base material each exposed through said each large pore have perimeters greater than or equal to 18 μm and less than or equal to 500 μm.

6. The porous composite according to claim 4, wherein said collection layer has pores with diameters greater than or equal to 3 μm and less than or equal to 20 μm in a region other than said plurality of large pores.

7. The porous composite according to claim 1, wherein said collection layer has a thickness greater than or equal to 6 μm, and in a photograph of sections of said collection layer and said base material captured at 500 times magnification by an SEM, a plurality of straight lines perpendicular to an interface between said collection layer and said base material are arranged at an equal interval along said interface, and a value obtained by dividing the number of a plurality of overlapping straight lines that overlap with pixels indicating said collection layer by a total number of said plurality of straight lines is greater than or equal to 50% and less than or equal to 90%.

8. The porous composite according to claim 7, wherein a value obtained by dividing the number of overlapping straight lines that overlap with pixels indicating said collection layer by an amount less than 10% of a thickness of said collection layer, among said plurality of overlapping straight lines, by the total number of said plurality of straight lines is greater than or equal to 30%.

9. The porous composite according to claim 1, wherein said base material has a honeycomb structure whose inside is partitioned into a plurality of cells by a partition wall, and at least some of said plurality of cells have inner surfaces covered with said collection layer.

10. The porous composite according to claim 9, being a gasoline particulate filter that collects particulate matter in an exhaust gas emitted from a gasoline engine.

* * * * *